United States Patent Office 2,930,814
Patented Mar. 29, 1960

2,930,814

PHOSPHONIUM CYCLOPENTADIENYLIDES

Fausto Ramirez, New York, N.Y., assignor to American Cyanamid Company, New York, N.Y., a corporation of Maine No Drawing. Original application April 25, 1957, Serial No. 654,998. Divided and this application April 25, 1958, Serial No. 730,820

5 Claims. (Cl. 260—606.5)

This invention relates to new intermediates for azo dyes. More specifically, it relates to compounds of the formula:

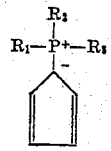

in which the R's are organic radicals in which carbon is directly bound to the phosphorus, the said organic radicals being free from basic nitrogen atoms and from strong acid groups. This application is a division of my copending application, Serial No. 654,998, filed April 25, 1957.

There has been developed recently a new and valuable olefin synthesis which involves the use of an intermediate phosphinemethylene. The phosphinemethylenes are compounds having the remarkable property of reacting with carbonyl groups to form a double bond between the carbon of the carbonyl and that of the methylene, with the elimination of a phosphine oxide. The phosphinemethylenes, however, are poorly stable, either in the solid state or in solution and their utilization as an intermediate in the preparation of dyestuffs in which the phosphinemethylene radical is retained unchanged would appear to be a very unpromising project.

I, however, have discovered that when the phosphinemethylene used is a phosphoniumcyclopentadieneylide a remarkable stability is achieved. Without limiting myself of any specific theory, I believe the stability to be due to the possibility of many resonance forms in which the negative charge in the cyclopentadiene ring may be located at the various corners of said ring. Such a phosphoniumcyclopentadienylide has the general structure:

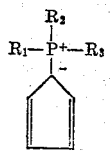

in which the R's are organic radicals with carbon directly bonded to phosphorus, the said radicals being free of basic nitrogen atoms and strong acid groups.

I have further found that this remarkably stable phosphoniumcyclopentadienylide structure is a quite active new coupling component, into which aromatic diazo compounds will readily couple. The diazonium compounds will couple twice into the cyclopentadienyl ring.

The phosphoniumcyclopentadienylides of my invention are prepared by the condensation of a phosphine with a dihalocyclopentadiene to form the resulting phosphonium halide. This intermediate is then treated with a caustic to give the phosphoniumcyclopentadienylide.

The phosphines which may be used in the preparation of these new compounds of my invention comprise any tertiary phosphine which is free of basic nitrogen and strong acid groups. The phosphine must be a tertiary phosphine, else the phosphonium halide intermediate will not react to form the zwitterion but instead will split off hydrogen halide, using the hydrogen on the phosphorus to give a new cyclopentadienyl phosphine. The phosphine must also be free of basic nitrogen atoms. Nitrogen heterocyclics such as pyridine, diazines, azoles, and the like, as well as free primary, secondary or tertiary amino groups may not be present, although nitrogen atoms which are not basic can be present. This is necessary to prevent the nitrogen atoms from reacting with the dihalocyclopentene. Nitrogen bases are stronger than phosphines and thus present a competitive reactive center for the reaction with the dihalocyclopentene. Also, the phosphine must have radicals free of strong acid groups such as sulfonic acid groups, since such groups, having a strongly acidic hydrogen, will react intramolecularly to destroy the stability of the phosphinemethylene. Weaker acid groups such as carboxy groups do not have this effect.

The groups which are linked to the phosphorus can be any aryl, aliphatic, alicyclic, or heterocyclic radicals which is free of the interfering structural characteristics. The groups may also be linked with the phosphorus in the ring. Examples of aryl groups are phenyl, halophenyl such as chlorophenyl, bromophenyl, and the like; alkylphenyls such as tolyl, ethylphenyl, xylyl, methylethylphenyl, butylphenyl, dodecylphenyl, or octadecylphenyl; alkoxyphenyls such as methoxyphenyl, butoxyphenyl, lauroxyphenyl, and the like; nitrophenyl; trifluoromethylphenyl; hydroxyphenyl; polyhydroxyphenyl; carboxyphenyl and esters thereof; acylaminophenyl, such as acetamidophenyl or benzamidophenyl; carboxamidophenyl and substituted carboxamidophenyl; sulfonamidophenyl and substituted sulfonamidophenyls such as

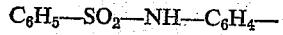

$H_2N$—$SO_2$—$C_6H_4$—, $(CH_3)_2N$—$SO_2$—$C_6H_4$—; alkylsulfonylphenyl; cyanophenyl; phenyl groups carrying several of these various substituents described, such as methylnitrophenyl; naphthyl, diphenyl, anthracyl, anthraquinonyl, benzanthronyl, dibenzanthronyl, and the like. Examples of aliphatic organic radicals which may be present include alkyl (e.g., methyl, ethyl, butyl, octyl, lauryl, or octadecyl); hydroxyalkyl such as beta-hydroxyethyl; halogenoalkyls such as chloroethyl, bromoethyl, fluoroethyl, trifluoroethyl and the like; carboxyalkyls and esters of carboxyalkyls such as carbalkoxymethyl, carbalkoxybutyl, carbalkoxylauryl, and the like; cyanoalkyls such as cyanoethyl and the like, as well as alkenyl such as allyl, crotyl, methallyl, aryalkyl such as benzyl and similar substituents. Examples of alicyclic substituents include cyclohexyl and substituted cyclohexyl groups, cyclopentyl, and the like. Heterocyclic groups such as thienyl, furyl, chromyl, benzothienyl, benzofuryl, and the like may be present, but as mentioned earlier, nitrogen heterocyclics must be excluded. Examples of such phosphines are:

Trimethylphosphine
Tris(chloromethyl)phosphine
Triethylphosphine
Tris(hydroxyethyl)phosphine
Tripropylphosphine
Tris(2-hydroxypropyl)phosphine
Triallylphosphine
Triisopropylphosphine
Tributylphosphine
Triisobutylphosphine
Tris(methallyl)phosphine
Triamylphosphine Tris(1-methylpropyl)phosphine
Tris(2-methylbutyl)phosphine
Trisisoamylphosphine
Trihexylphosphine
Triheptylphosphine
Trioctylphosphine
Tribenzylphosphine
Triphenylphosphine
Tris-o-chlorphenylphosphine
Tris-m-chlorphenylphosphine
Tris-p-chlorphenylphosphine
Tri-o-methoxyphenylphosphine
Tri-m-methoxyphenylphosphine
Tri-p-methoxyphenylphosphine
Tri-p-phenoxyphenylphosphine
Tri-o-tolylphosphine
Tri-m-tolylphosphine
Tri-p-tolylphosphine
Tri-2,4-xylylphosphine
Tri-2,5-xylylphosphine
Tri-2,4,5-trimethylphenylphosphine
Tri-2,4,6-trimethylphenylphosphine
Tri-1-naphthylphosphine
Tri-2-biphenylphosphine
Tri-4-biphenylphosphine
Ethyldimethylphosphine
Benzyldimethylphosphine
Phenyldimethylphosphine
4-methoxyphenyl dimethyl phosphine
4-bromophenyl dimethyl phosphine
4-phenoxyphenyl dimethylphosphine
4-tolyldimethylphosphine
4-benzylphenyl dimethyl phosphine
4-(2-phenylethyl)phenyl dimethyl phosphine
2,5-xylyl dimethyl phosphine
2,4,6-trimethylphenyl dimethyl phosphine
Methyl diethyl phosphine
Propyl diethyl phosphine
Benzyl diethyl phosphine
Phenyl diethyl phosphine
4-hydroxyphenyl diethyl phosphine
4-ethoxyphenyl diethyl phosphine
1-naphthyl diethyl phosphine
2-thienyl diethylphosphine
Phenyl bis-ethoxycarbonyl phosphine
Phenyl bis-p-carboxyphenyl phosphine
Phenyl diallyl phosphine
4-bromophenyl diallyl phosphine
4-isopropylphenyl diallyl phosphine
Phenyl dimethallyl phosphine
Phenyl diisohexyl phosphine
Ethyl diphenyl phosphine
Ethoxy carbonyl diphenyl phosphine
Phenyl cyclotetramethylene phosphine
Phenyl cyclopentamethylene phosphine
Phenyl-14-oxaphosphorin
Ethyl isopropyl isobutylphosphine
Ethyl phenylbenzyl phosphine
Ethyl phenyl 4-methoxyphenyl phosphine Such phosphines are reacted with a di-halogenocyclopentene, such as 3,5-dibromo- or dichlorocyclopentene. Cyclopentadiene is conveniently prepared by the distillation of dicyclopentadiene, depolymerization occurring during the distillation, and then is halogenated, preferably with bromine, as formed. The halogenation takes the form of a 1,4- addition, giving the dihalocyclopentene. Two mols of phosphine are then added to the very cold solution of the halocyclopentene and the mixture is allowed to warm and heated until reaction is complete. It is preferable to use a second mol of the phosphine in order to form the cyclopentenyl bis-phosphonium halide. If only one mol is used, the resulting halogenocyclopentenyl phosphonium halide has competitive reactive centers which, in the next step of the preparation, may cause much lower yields of the desired product.

The phosphonium cyclopentadienylide is formed from the cyclopentenyl bi-phosphonium halide by the action of alkalies such as sodium or potassium hydroxide. These reactions are usually run in an inert solvent such as chloroform, which is evaporated after the phosphonium cyclopentadienylide has been formed. The crude products can be recrystallized from various solvents, being quite soluble in many organic solvents in spite of the internal dipole.

I have further observed and discovered that phosphonium cyclopentadienylides readily couple with aromatic diazo compounds. Such coupling occurs either in organic solvents or in hydrophilic organic solvents diluted with water, the limiting factor being the solubility of the phosphonium cyclopentadienylide in the organic solvent. Such hydrophilic solvents as pyridine, dimethylformamide and others in which the cyclopentadienylides are soluble can be used. Coupling occurs twice into the cyclopentadiene ring, depending upon the amount of diazo used, a mono coupling being readily achievable.

Any aromatic diazonium compound capable of coupling with a coupling component can be used to form the azo dyes of my invention. Examples of aromatic amines which may be diazotized and coupled into the phosphoniumcyclopentadieneylides include aniline and its derivatives such as ortho-, meta- or para-toluidine; ortho-, meta- or para-anisidine; ortho-, meta- or para-ethoxyaniline; the butoxy anilines; para-nitroaniline; ortho-, meta- or para-chloraniline; ortho-, meta- or para-bromoaniline; p-diethylaminoaniline, anthranilic acid, p-aminobenzoic acid, the toluic acids, dialkoxyanilines such as 2,5-dimethoxyaniline, m-trifluoromethylaniline, m-methylsulfonyl aniline, more complex substituted anilines such as 4-chloro-2-nitro aniline, 2-chloro-p-toluidine, 3-amino-4-methoxydiphenylsulfone, 3-amino - 4 - methoxybenzanilide, and the like, and sulfonic acid derivatives of these various compounds; α-naphthylamine, β-naphthylamine, naphthionic acid, Laurent acid, peri acid, Cleve's acid, H-acid, Chicago acid, and the like; aminodiphenyls such as 2-aminodiphenyl, 4-aminodiphenyl, and the like; aminoanthraquinones such as 1-aminoanthraquinone, 2-aminoanthraquinone, 1-amino-2-carboxyanthraquinone, 1-amino-4-bromoanthraquinone-2-sulfonic acid, and the like; diamines such as benzidine, dianisidine, tolidine, dichlorobenzidine, and the like; diaminostilbenes; diaminodibenzothiophene dioxide; diaminodiphenyl urea; diaminodiphenylamine; aminoazo compounds such as 2-methyl-4-(4,8-dislfo - 2 - naphthylazo)aniline; 4-aminopyridine; 2-aminobenzothiazole, and the many other aromatic diazothizable amines which form the basis of the azo dyestuffs of commerce.

When dyes are formed in which there are acid groupings, the soluble salts can be just as readily used as the free acids, although I chose to write the structures in the free acid form in these specifications and claims.

It is an advantage of my invention that I have found a unique aromatic structure which is both stable and active in its ability to couple. It is a further advantage of my invention that the dyestuffs of my invention prepared from the unique phosphoniumcyclopentadienylides of my invention are substantive on such fibers as wool, nylon (both of the hexamethylaminediamine polyadipate type and of the type of the polyamide from ε-amino caproic acid), on polyacrylic fibers of all sorts, both homopolymers and copolymers, and on superpolyesters such as glycol terephthalate. It is a further advantage of my invention that a large variety of colors are obtainable, varying from yellows to reds to deep blues and greens. In some cases the color obtained varies with the same dyestuff on different fibers.

It is a further advantage of my invention that the intermediate phosphoniumcyclopentadienylides have a remarkable solubility in organic solvents and that this property is readily usuable to permit coupling in situ in organic solutions, a property which readily permits the formation in situ of colors in resin solution and the like.

My invention can be illustrated by the following examples in which parts are by weight unless otherwise specified.

Example 1

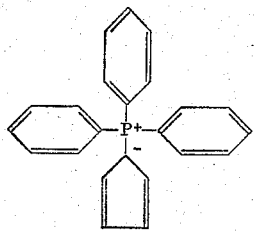

The reaction vessel is flushed with nitrogen to remove air. A solution of 22 parts of cyclopentadiene (prepared by the distillation of technical dicyclopentadiene) in 45 parts of chloroform is introduced followed by the rapid addition of 53.5 parts of bromine. The temperature of the mixture is kept at −30 to −40° C. during the addition of the mixture, it is then stirred at temperatures down to −75° C. until the reaction is substantially complete. A solution of 175 parts of triphenylphosphine in 900 parts of chloroform is then added to the cold solution. The mixture is allowed to warm and then is refluxed until reaction is substantially complete. The chloroform is removed under reduced pressure and the glassy residue is dissolved in methanol. The solution of the product is treated with a solution of 45 parts of sodium hydroxide in 175 parts of water. The precipitated solid is collected by filtration, washed with methanol and petroleum ether and dried.

Example 2

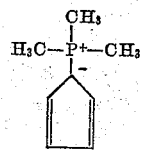

The procedure of Example 1 is followed using an equivalent amount of trimethylphosphine in place of the triphenylphosphine. Similarly, the corresponding products are obtained when equivalent amounts of tripropylphosphine, trihexylphosphine, ethyldimethylphosphine, or ethyl isopropyl isobutyl phosphine are used.

Example 3

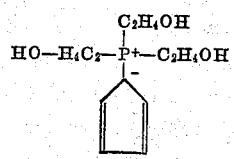

The process of Example 1 is followed, using an equivalent amount of tris-hydroxyethyl phosphine in place of the triphenylphosphine. Similarly, an equivalent amount of tris-(2-hydroxypropyl) phosphine gives the corresponding product.

Example 4

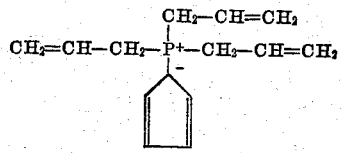

The procedure of Example 1 is followed using an equivalent amount of triallylphosphine in place of the triphenylphosphine.

Example 5

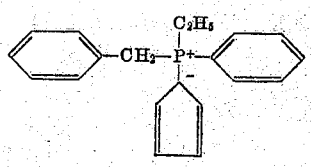

The procedure of Example 1 is followed using an equivalent amount of ethyl benzyl phenyl phosphine in place of the triphenylphosphine.

Example 6

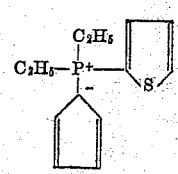

The procedure of Example 1 is followed using an equivalent amount of 2-thienyl diethyl phosphine in place of the triphenylphosphine.

Example 7

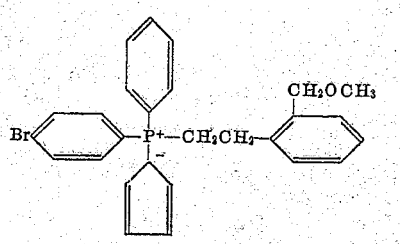

The procedure of Example 1 is followed using an equivalent amount of phenyl bromophenyl 2-(o-methoxymethylphenyl)ethyl phosphine in place of the triphenylphosphine.

Example 8

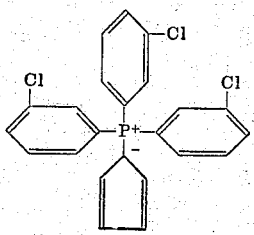

The procedure of Example 1 is followed using an equivalent amount of tri-m-chlorophenyl phosphine in place of the triphenylphosphine. Similarly, the corresponding substituted product is obtained by using equivalent amounts of tri-1-naphthylphosphine, tri-p-tolylphosphine, tri-p-phenoxyphenyl phosphine, and tri-4-biphenyl phosphine.

Example 9

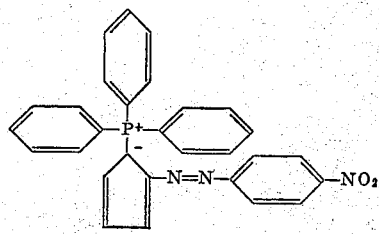

A solution of 2.07 parts of para-nitroaniline in 3.9 parts of concentrated hydrochloric acid and 3 parts of water is cooled to 0-5°. 1.05 parts of sodium nitrite in 2.5 parts of water is added to diazotize the nitroaniline. Five parts of sodium acetate is then added slowly at 0-5°, followed by a solution of 4.89 parts of triphenylphosphonium cyclopentadienylide in 200 parts of methylene chloride. The mixture is stirred at 0-5° until the reaction is substantially complete. The mixture is then extracted with 5% aqueous sodium hydroxide, the aqueous layer separated and extracted with warm ethylene chloride which is combined with the methylene chloride layer from the reaction mixture. The methylene chloride is then removed under reduced pressure and the residue is treated with 200 parts of methanol. The insoluble azo dye is then isolated by filtration.

By using an equivalent quantity of aniline in place of the p-nitroaniline, the corresponding dye is obtained.

*Example 10*

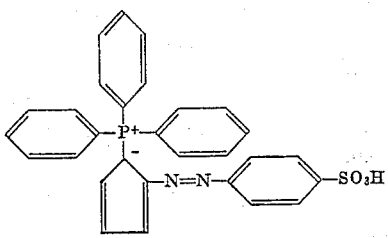

Sulfanilic acid (8.6 parts) is diazotized by addition of sodium nitrite to an acid (HCl) solution of about 250 parts by volume until nitrite is in excess. The diazo slurry is then added to a solution of 16.3 parts of triphenyl phosphonium cyclopentadienylide in 300 parts of pyridine at 5-10° C. The mixture is stirred until coupling is complete and then salted with 1000 parts of 30% brine. Pyridine is evaporated and the product is isolated by filtration and washed with brine. A similar dye is obtained from diethylamino aniline by the same procedure.

*Example 11*

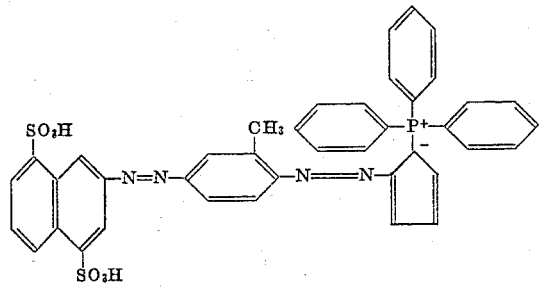

The procedure of Example 10 is followed using 23.3 parts of sodium 2-(4-amino-3-methylphenylazo) naphthalene-4,8-disulfonate in place of the sulfanilic acid.

*Example 12*

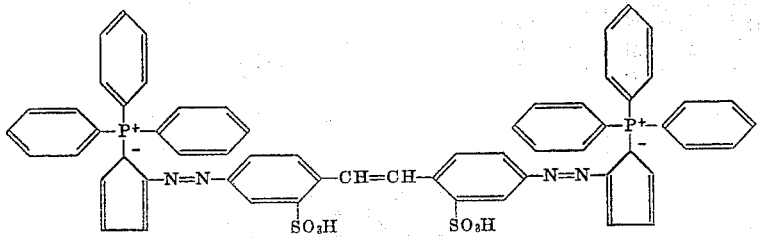

Sodium diaminostilbene sulfonate is diazotized in dilute HCl solution and coupled with triphenylphosphonium cyclopentadienylide in the procedure of Example 10. The bis-azo dyes from 3,8-diamino dibenzothiophene dioxide disulfonic acid and dianisidine, are prepared similarly.

*Example 13*

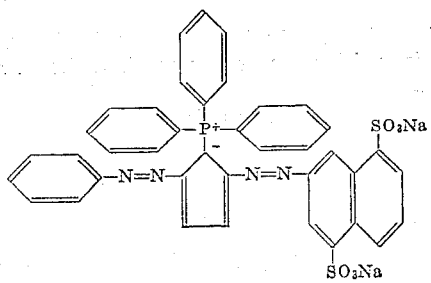

Sodium 2 - aminonaphthalene - 4,8-disulfonate (17.4 parts) is diazotized by dissolving in 100 ml. of water with 3.45 parts of sodium nitrite and subsequent acidifying with a dilute hydrochloric acid solution. The diazo solution is added to a solution of 21.0 parts of triphenylphosphonium - (2 - phenylazo)cyclopentadienylide (prepared as described in Example 9) in 400 parts of pyridine at 5-10° C. The dye is isolated in the usual manner.

In the same manner naphthionic acid can be used in place of 2-amino-naphthalene-4,8-disulfonate in the first coupling to give a similar disazo dye.

*Example 14*

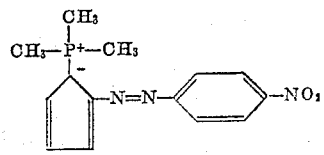

The procedure of Example 9 is followed using the product of Example 2 in place of the triphenylphosphonium cyclopentadienylide. Similar products are obtained if the products of Examples 3, 4, 5, 6, 7 and 8 are used instead.

*Example 15*

Glycolpolyterephthalate fibers are dyed with the product of Example 9 by dispersing the azo compound (0.05 part) in water (300 parts) with 0.05 part of sodium lauryl sulfate and 0.05 part of methyl salicylate. The cloth (5 parts) is immersed in the dispersion and held at 200° F. for about 1 hour.

*Example 16*

Nylon (5 parts) is dyed with the product of Example 9 by dispersing the dye (0.05 part) in water (300 parts) with sodium lauryl sulfate (0.05 part) immersing the cloth for 1 hour at 212° F., with the addition of 0.15 part of ammonium acetate.

*Example 17*

Polyacrylonitrile fibers (5 parts) are dyed with the products of Example 9 by dispersing the dye (0.05 part) with 0.05 part of sulfamic acid, adding 0.03 part of acetic acid and 0.15 part of sodium acetate, and heating the cloth in this solution for 1 hour at 212° F.

*Example 18*

Various fibers are dyed with the products of Examples 9-14 by the procedures of Examples 15-17. The dyeings have the following colors. The coupling component is the triphenylphosphonium cyclopentadienylide in all cases.

| Diazo | Cotton | Silk | Nylon | Polyacrylonitrile | Wool | Glycolterephthalate |
|---|---|---|---|---|---|---|
| p-Nitraniline | | | pink | yellow | pink | pink. |
| Sulfanilic acid | tan | brown | brown | | brown | |
| Diaminodibenzothiophene dioxide disulfonic acid | gray | do | do | | do | |
| Diaminostilbene disulfonic acid | pink | red | pink | light pink | red-brown | |
| Diethylamino aniline | gray | blue | brown | bluish-gray | gray | gray. |
| Aniline and 2-amino-naphthalene-4,8-disulfonic acid | tan | brown | do | tan | brown | |
| Aniline and 1-amino-naphthalene-4-sulfonic acid | | violet | violet | brown | violet | |

I claim:
1. Compounds of the formula:

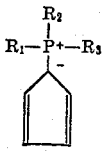

in which $R_1$, $R_2$ and $R_3$ are organic radicals selected from the group consisting of aryl, alkyl, aralkyl, haloalkyl, hydroxyalkyl, carboxyalkyl, carbalkoxyalkyl, alkenyl, cyanoalkyl, cycloalkyl, thienyl, furyl, chromyl, benzothienyl and benzofuryl, the said radicals having carbon directly bound to the phosphorus, and being free of basic nitrogen atoms and of strong acid groups.

2. The compounds of claim 1 in which $R_1$, $R_2$ and $R_3$ are each aryl.

3. The compound of claim 2 in which all three R's are phenyl.

4. Compounds of claim 1 in which the R's are alkyl.

5. Compounds of claim 4 in which all three R's are methyl.

References Cited in the file of this patent

The Van Nostrand Chemist's Dictionary, D. Van Nostrand Co., Inc., New York, 1953, page 44.